June 5, 1923.
A. W. WHARTON
AUTOMOBILE BUFFER
Filed Feb. 28, 1923
1,457,331
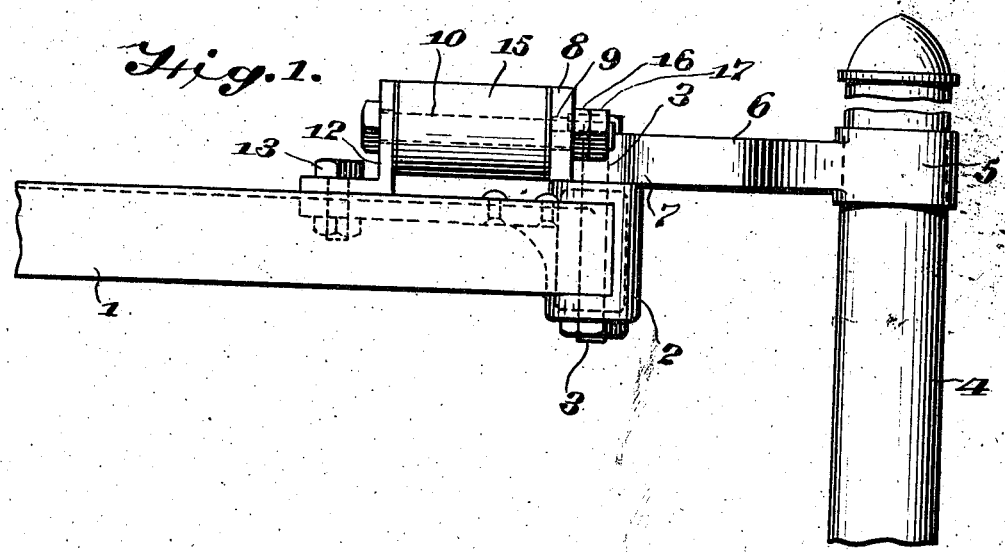
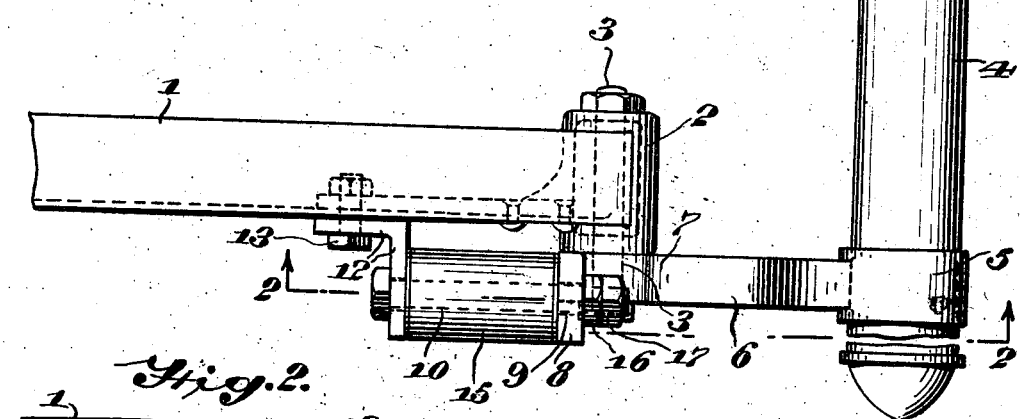
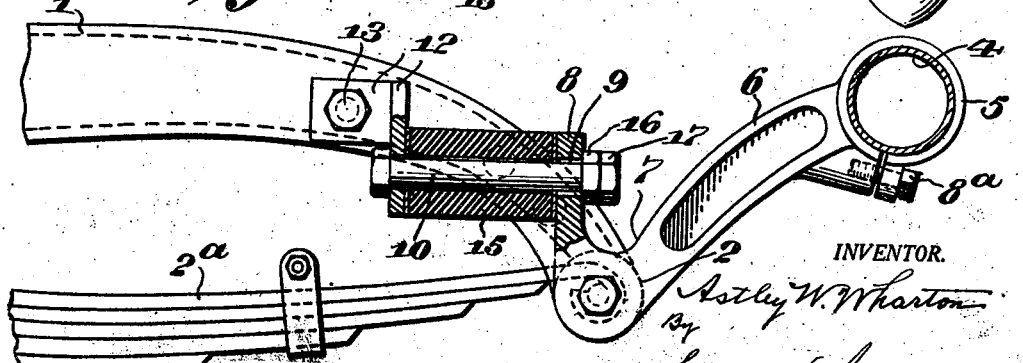
INVENTOR.
Astley W. Wharton
By Cyrus N. Anderson
ATTORNEY.

Patented June 5, 1923.

1,457,331

UNITED STATES PATENT OFFICE.

ASTLEY W. WHARTON, OF CHURCHVILLE, PENNSYLVANIA.

AUTOMOBILE BUFFER.

Application filed February 28, 1923. Serial No. 621,866.

*To all whom it may concern:*

Be it known that I, ASTLEY W. WHARTON, a citizen of the United States, and a resident of Churchville, in the county of Bucks and State of Pennsylvania, have invented an Improvement in Automobile Buffers, of which the following is a specification.

My invention relates to buffers for automobiles and other vehicles and it has for its object to provide a simple and novel construction of buffer which is efficient for its purpose and which may be cheaply manufactured and readily and economically installed. The invention resides in the combination and arrangement of parts as hereinafter fully described and claimed and as illustrated in the accompanying drawing in which I have illustrated one convenient form of embodiment thereof.

In the drawing:

Fig. 1 is a top plan view of a buffer construction embodying my invention and in which is shown in top plan end portions of the opposite sides of an automobile chassis or frame upon which the buffer is supported; and Fig. 2 is a view in sectional side elevation taken on the line 2—2 of Fig. 1.

Referring to the drawing: 1 designates the opposite side members of a chassis or frame of an automobile or other like structure having the usual knub end portions 2 to which one end of the springs 2ª at the opposite sides of the structure are secured by means of bolts 3 which extend through horizontal holes through said knubs.

4 designates a buffer bar supported in split bearing sleeves 5 upon the outer ends of the outwardly and upwardly extending arms 6 of levers 7 which are also provided with arms 8 which extend upwardly in a substantially vertical direction, as shown. The buffer bar 4 is clamped and held in the bearing sleeves 5 by means of clamping bolts 8ª. These levers are pivoted upon the bolts 3 at points substantially co-incident with the apexes of the angles between the arms 6 and 8. The upwardly extending arms are provided with openings 9 through which the outer ends of horizontally extending bolts 10 extend. The said bolts also extend through openings in the outwardly extending portions of lugs 12 which are secured to the outer sides of the side members 1 of the automobile or other vehicle frame. The lugs 12 are secured to the said side members 1 by means of bolts 13, as shown.

Sleeves 15 of rubber or other suitable resilient material are mounted upon the bolts 10 between the outwardly extending portions of the lugs 12 and the upwardly extending arms 8 of the levers 7. The arms 8 and the sleeves 15 are retained upon the bolts 10 by means of clamping and binding nuts 16 which are retained in place by lock nuts 17. By screwing these nuts tightly against the outer sides of the arms 8 the latter are clamped firmly against the outer ends of the sleeves 15 so as to compress the latter and hold the same under such tension as may be deemed desirable.

It will be noted that the openings 9 are of slightly greater diameter than the diameter of the bolts 10 whereby in case the buffer bar 4 should strike an obstruction pivotal movement of the levers 7 will not be too greatly hindered or opposed.

It will be seen that by reason of the arrangement, as shown, in which the buffer bar 4 is mounted upon the arms 6 which are quite long as compared with the arms 8 the said buffer bar may be moved through considerable distance in case of collision without the necessity of an extensive movement of the arms 8. By reason of the fact that the buffer bar 4 may be permitted to move through an arc of relatively great length in case of collision the presence of said buffer bar affords a greater factor of safety than would be present with the said bar confined to a shorter and more limited movement. In other words, the shock incident to a collision would be spread over a greater period of time and would be gradually absorbed by the vehicle structure upon which the buffer is mounted.

Having thus described my invention, what I claim and desire to secure by Letters Patent is:

1. In a buffer for vehicles, the combination of levers having forwardly extending arms and upwardly and vertically extending arms, the latter having horizontal openings therethrough, a buffer bar supported upon the outer ends of the forwardly extending arms, means for pivotally connecting the said levers at the angles between the said arms to one or the other end portions of a vehicle structure, horizontally extending bolts having connection at their inner ends to the said vehicle structure and at their forward ends extending through the openings in the said vertical arms, elastic sleeves upon said bolts situated intermediate the said arms and the portions of the said vehicle structure to which the said bolts are connected, and means in engagement with the outer ends of said bolts for clamping the said sleeves between the said arms and the said portion of the vehicle structure.

2. In a buffer for vehicles, the combination of a chassis having oppositely disposed side members, each of which is provided with an outwardly extending lug having a horizontal opening therethrough, levers having outwardly and upwardly extending arms and also having vertically and upwardly extending arms, the latter having horizontal openings extending therethrough, a buffer bar secured to the outer ends of the said outwardly extending arms, means for pivotally connecting the said levers at points substantially co-incident with the apexes of the angles between the arms thereof to the ends of the side members of the said chassis, bolts extending through the openings in the said lugs and in the said vertically extending arms, resilient members mounted upon said bolts and situated between the said lugs and the said vertically extending arms, and means for clamping the said resilient members between the said lugs and said arms.

3. In a buffer for automobiles, the combination of the opposite side members of a chassis, which side members are provided with outwardly extending lugs adjacent the ends thereof, said lugs having horizontal openings therethrough, a bell crank lever pivoted to an end of each of said side members adjacent said lugs, one arm of each of said levers extending outwardly and upwardly and another arm extending upwardly and vertically, each of said upwardly and vertically extending arms being provided with a horizontal opening therethrough, a buffer bar secured to the outer ends of the first named arms, pivot bolts for connecting the said bell crank levers to the ends of said side members, said pivot bolts having pivotal connection with the said levers at the angles between the arms thereof, bolts extending through the openings in said lugs and the said vertically and upwardly extending arms, rubber sleeves mounted upon said bolts and situated intermediate the said lugs and the said vertically and upwardly extending arms, and clamping means upon the outer ends of said bolts for clamping the said arms against the outer ends of said sleeves for compressing the same between the said arms and the said lugs, substantially as described.

In testimony that I claim the foregoing as my invention, I have hereunto signed my name this 27th day of February, A. D. 1923.

ASTLEY W. WHARTON.